United States Patent
Singh et al.

(10) Patent No.: US 9,954,694 B2
(45) Date of Patent: Apr. 24, 2018

(54) TRAFFIC BLACK HOLING AVOIDANCE AND FAST CONVERGENCE FOR ACTIVE-ACTIVE PBB-EVPN REDUNDANCY

(71) Applicant: Juniper Networks, Inc., Sunnyvale, CA (US)

(72) Inventors: Tapraj Singh, San Ramon, CA (US); Arijit Paul, Cupertino, CA (US); Sunesh Rustagi, San Jose, CA (US); Vikas V. Patel, San Jose, CA (US); Manoj Sharma, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 117 days.

(21) Appl. No.: 14/983,718

(22) Filed: Dec. 30, 2015

(65) Prior Publication Data

US 2017/0195135 A1  Jul. 6, 2017

(51) Int. Cl.
*H04L 12/46* (2006.01)
*H04L 29/12* (2006.01)
(Continued)

(52) U.S. Cl.
CPC ........ *H04L 12/4679* (2013.01); *H04L 12/462* (2013.01); *H04L 45/50* (2013.01); *H04L 45/68* (2013.01); *H04L 61/6022* (2013.01)

(58) Field of Classification Search
CPC ... H04L 12/4679; H04L 12/462; H04L 45/68; H04L 45/50; H04L 61/6022
See application file for complete search history.

(56) References Cited

U.S. PATENT DOCUMENTS

| | | | |
|---|---|---|---|
| 9,019,814 B1* | 4/2015 | Mohanty | H04L 45/00 370/219 |
| 2008/0225695 A1* | 9/2008 | Balus | H04L 12/462 370/216 |

(Continued)

OTHER PUBLICATIONS

Sajassi et al., "Provider Backbone Bridging Combined with Ethernet VPN (PBB-EVPN)," Internet Working Group Draft, draft-ieff-l2vpn-pbb-evpn-10, May 14, 2015, 22 pp.
(Continued)

*Primary Examiner* — Pao Sinkantarakorn
*Assistant Examiner* — Kabir Jahangir
(74) *Attorney, Agent, or Firm* — Shumaker & Sieffert, P.A.

(57) ABSTRACT

In one example, a method includes configuring a first provider edge (PE) router of a Provider Backbone Bridging (PBB) Ethernet Virtual Private Network (EVPN) to join an Ethernet Segment in active-active mode with at least a second PE router that is operating as a designated forwarder for the Ethernet Segment; receiving, by the first PE router from a remote PE router and prior to the first PE router performing Media Access Control (MAC) learning of a customer-MAC (C-MAC) address that is reachable via a backbone-MAC (B-MAC) address associated with the Ethernet Segment, a network packet that includes the C-MAC address; and in response to determining that the C-MAC address has not been learned by the first PE router and the B-MAC address included in the network packet is associated with the Ethernet Segment, forwarding, by the first PE router, the network packet to a destination identified by the C-MAC address.

20 Claims, 5 Drawing Sheets

(51) Int. Cl.
*H04L 12/723* (2013.01)
*H04L 12/721* (2013.01)

(56) References Cited

U.S. PATENT DOCUMENTS

| | | |
|---|---|---|
| 2008/0228943 A1 | 9/2008 | Balus et al. |
| 2012/0219004 A1 | 8/2012 | Balus et al. |
| 2017/0141963 A1* | 5/2017 | Chalapathy ............. H04L 41/12 |

OTHER PUBLICATIONS

Sajassi et al., "BGP MPLS-Based Ethernet VPN," RFC 7432, Internet Engineering Task Force (IETF), Feb. 2015, 56 pp.
"Ethernet VPN (EVPN) and Provider Backbone Bridging-EVPN: Next Generation Solutions for MPLS-based Ethernet Services," Cisco Systems Inc., May 2014, 10 pp.
Sajassi et al., "Provider Backbone Bridging Combined with Ethernet VPN (PBB-EVPN)", RFC 7623, Internet Engineering Task Force (IETF), Sep. 2015, 23 pp.
Extended Search Report from counterpart European Application No. 16204290.7, dated Jun. 2, 2017, 10 pp.
Response to Extended Search Report dated Jun. 2, 2017, from counterpart European Application No. 16204290.7, filed Jan. 4, 2018, 13 pp.

* cited by examiner

TRAFFIC BLACK HOLING AVOIDANCE AND FAST CONVERGENCE FOR ACTIVE-ACTIVE PBB-EVPN REDUNDANCY

TECHNICAL FIELD

The invention relates to computer networks and, more specifically, to forwarding network traffic within computer networks.

BACKGROUND

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) (also referred to as pseudowires) within the provider network to carry encapsulated L2 communications as if these customer networks were directly attached to the same local area network (LAN). In some configurations, the PE network devices may also be connected by an Internet Protocol (IP) infrastructure in which case IP/Generic Routing Encapsulation (GRE) tunneling or other IP tunneling can be used between the network devices.

EVPN may be combined with Provider Backbone Bridging (PBB) defined in accordance with IEEE standard 802.1ah. PBB defines an architecture and bridging protocols in which a Provider Backbone Bridged Network (PBBN) provides L2 connectivity between multiple provider bridge networks (PBNs) of one or more different network service providers. Such large area L2 network connectivity may be deployed, for example, in metropolitan area networks. Each PBN provides one or more service virtual LANs ("S-VLANS") to service and isolate L2 traffic from customer networks. Access switches for the PBBN typically include a set of Backbone Edge Bridges (BEBs) that interconnect some or all of the S-VLANs supported by multiple PBNs. Each BEB provides interfaces that further encapsulate L2 frames for transport through the PBBN. The VLANs used to encapsulate L2 frames from the PBNs and transport the L2 traffic through the PBBN are known as backbone VLANs (B-VLANs), and the resources that support those VLANs are usually considered to be part of the PBBN. In this way, the PBBN may be referred to as a Virtual Bridged Local Area Network under the administrative control of a backbone provider. PBB-EVPN combines functionality of an EVPN and PBB BEB bridge, such that Multi-Protocol Label Switching (MPLS) LSPs defined in an EVPN are mapped to PBB encapsulated traffic.

In a PBB-EVPN, a set of PE routers may operate in a common Ethernet Segment in active-active mode with all PE routers forwarding network traffic in the Ethernet Segment. One of the PE routers in the Ethernet Segment may operate as a designated forwarder (DF) to forward Broadcast, Unknown Unicast, and Multicast (BUM) traffic while the other PE routers in the Ethernet Segment drop BUM traffic. The Ethernet Segment may also be associated with a Backbone Media Access Control (B-MAC) address, which is used by remote PE routers to forward network traffic through a service provider network to the set of PE routers included in the common Ethernet Segment. In some examples, a remote PE router may forward a known unicast packet to a particular non-DF PE router that is associated with the B-MAC address. Although the remote PE router may have already learned the destination Customer-MAC (C-MAC) thereby causing the remote PE router to send the network packet as known unicast traffic, the particular PE router may not have yet learned the C-MAC address. As such, although the particular PE router may include a path via the Ethernet Segment to forward the network packet to its destination, the particular PE router may treat the known unicast traffic as BUM traffic (i.e., drop the traffic) because the particular PE router does not recognize the C-MAC address and the particular PE router is not the DF.

SUMMARY

The techniques described herein enable a particular PE router included in an Ethernet Segment of a PBB-EVPN to forward known unicast traffic from a service provider network to a customer network, although the PE router has not previously learned the destination C-MAC address and the particular PE router is not the designated forwarder (DF) for the Ethernet Segment. For instance, the PBB-EVPN may initially include a set of PE routers operating in active-active mode, in which one of the set of PE routers operates as a DF for forwarding BUM traffic. The set of PE routers may forward network traffic to a remote PE router, which performs MAC learning on source C-MAC addresses included in the network traffic. As part of the MAC learning, the remote PE router may store associations between source C-MAC addresses and a source B-MAC address that corresponds to the Ethernet Segment from which the network packets were sent to the remote PE router. At a later time, a particular PE router may join the Ethernet Segment as a non-DF router and advertise its reachability to the remote PE based on a B-MAC address associated with the Ethernet Segment.

If the remote PE router receives a network packet which includes a destination C-MAC address that it previously learned, the remote PE router may forward the network packet to any of the PE routers associated with the B-MAC for the Ethernet Segment. If the remote PE router forwards the network packet to the particular PE router that joined the Ethernet Segment, the particular PE router will perform a lookup in its C-MAC table for the destination C-MAC address included in the network packet. If the particular PE router did not previously learn the destination C-MAC address, the particular PE router would conventionally drop the network packet as BUM traffic because the particular PE router is not the DF for the Ethernet Segment associated with the destination B-MAC included in the network packet. Rather than drop the network packet, the PE router is configured to perform an additional lookup in accordance with techniques of the disclosure to determine whether the destination B-MAC of the network packet matches a B-MAC included in the B-MAC table of the particular PE router. If a match exists, the particular PE router determines an egress interface of the Ethernet Segment that corresponds to the matching B-MAC, and forwards the network packet using the egress interface. Because the destination for the network packet is reachable via the Ethernet Segment, the particular PE router can still forward the network packet to the destination, although the particular PE router has neither previously learned the destination C-MAC address, nor is the particular PE router the DF for the Ethernet Segment. By allowing a PE router to perform an additional lookup on the B-MAC table when forwarding network traffic from the service provider network to a customer network, techniques of the disclosure enable the PE router to avoid dropping network packets when a path to the destination exists at the particular PE router.

In one example, a method includes configuring a first provider edge (PE) router of a Provider Backbone Bridging (PBB) Ethernet Virtual Private Network (EVPN) to join an Ethernet Segment in active-active mode with at least a second PE router that is operating as a designated forwarder for the Ethernet Segment, receiving, by the first PE router from a remote PE router and prior to the first PE router performing Media Access Control (MAC) learning of a customer-MAC (C-MAC) address that is reachable via a backbone-MAC (B-MAC) address associated with the Ethernet Segment, a network packet that includes the C-MAC address, and in response to determining that the C-MAC address has not been learned by the first PE router and that the B-MAC address included in the network packet is associated with the Ethernet Segment, forwarding, by the first PE router, the network packet to a destination identified by the C-MAC address.

In another example, a first provider edge (PE) router of a Provider Backbone Bridging (PBB) Ethernet Virtual Private Network (EVPN), includes a control unit having at least one processor coupled to a memory, wherein the control unit executes software configured to: join an Ethernet Segment in active-active mode with at least a second PE router that is operating as a designated forwarder for the Ethernet Segment; receive, from a remote PE router and prior to the first PE router performing Media Access Control (MAC) learning of a customer-MAC (C-MAC) address that is reachable via a backbone-MAC (B-MAC) address associated with the Ethernet Segment, a network packet that includes the C-MAC address; and in response to determining that the C-MAC address has not been learned by the first PE router and that the B-MAC address included in the network packet is associated with the Ethernet Segment, forward the network packet to a destination identified by the C-MAC address.

In a further example, a computer-readable medium includes instructions for causing at least one programmable processor of a first (PE) router to: join an Ethernet Segment in active-active mode with at least a second PE router that is operating as a designated forwarder for the Ethernet Segment; receive, from a remote PE router and prior to the first PE router performing Media Access Control (MAC) learning of a customer-MAC (C-MAC) address that is reachable via a backbone-MAC (B-MAC) address associated with the Ethernet Segment, a network packet that includes the C-MAC address; and in response to determining that the C-MAC address has not been learned by the first PE router and that the B-MAC address included in the network packet is associated with the Ethernet Segment, forward the network packet to a destination identified by the C-MAC address.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
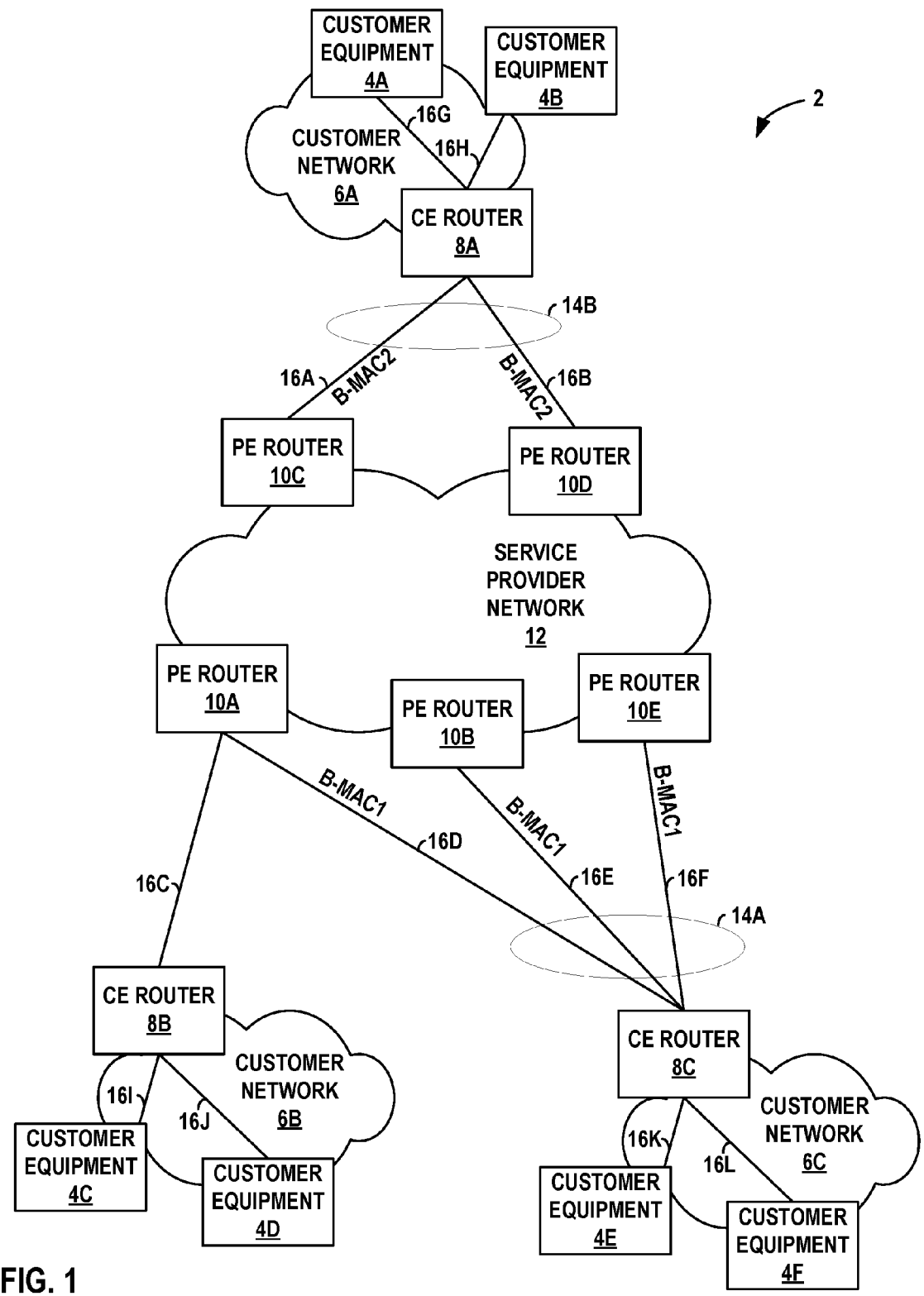
FIG. 1 is a block diagram illustrating an example system, in accordance with techniques of the disclosure.

FIG. 1 is a block diagram illustrating an example system 2, in accordance with techniques of the disclosure. In the example of FIG. 1, PE routers 10A-10E ("PE routers 10") provide customer equipment 4A-4F ("customer equipment 4") associated with customer networks 6A-6C ("customer networks 6") with access to service provider network 12 via CE routers 8A-8C ("CE routers 8"). Communication links 16A-16L may be Ethernet connections, Asynchronous Transfer Mode (ATM) connections or any other suitable network connections.

PE routers 10 and CE routers 8 are illustrated as routers in the example of FIG. 1. However, techniques of the disclosure may be implemented using switches or other suitable network devices that participate in a layer two (L2) virtual private network service, such as an Ethernet Virtual Private Network (EVPN) or Provider Backbone Bridging (PBB)-EVPN. Customer networks 6 may be networks for geographically separated sites of an enterprise. Each of customer networks 6 may include additional customer equipment 4A-4F, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely an example. For example, an enterprise may include any number of customer networks 6. Nonetheless, for ease of description, only customer networks 6A-6C are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes L2 EVPN service. For example, an EVPN is a service that provides a form of L2 connectivity across an intermediate L3 network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures various devices included within service provider network 12 that interface with L2 customer networks 6. The EVPN configuration may include an EVPN instance (EVI), which consists of one or more broadcast domains. Generally, an EVI may refer to a routing and forwarding instance on a PE router, such as PE routers 10A-10B and 10E. Consequently, multiple EVIs may be configured on PE routers 10 for Ethernet segment 14A, as further described herein, each providing a separate, logical layer two (L2) forwarding domain. In this way, multiple EVIs may be configured that each includes one or more of PE routers 10A-10B and 10E of Ethernet segment 14A. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

FIG. 1 illustrates a PBB-EVPN environment that includes Ethernet Segments 14A and 14B. In typical operation, PE routers 10 communicate using the Border Gateway Protocol (BGP). PE routers 10 may interoperate using BGP in accordance with the techniques described in Provider Backbone Bridging Combined with Ethernet VPN (PBB-EVPN), draft-ietf-l2vpn-pbb-evpn-10, Nov. 14, 2015, the entire contents of which are incorporated herein by reference. PBB-EVPN enables one or more routers to operate in single-active redundancy mode or all-active (e.g., active-active) redundancy mode. In single-active redundancy mode, only a single PE router, among a group of PE routers attached to an Ethernet segment, is allowed to forward traffic to/from that Ethernet Segment, then the Ethernet segment is defined to be operating in Single-Active redundancy mode. For instance, PE router 10B may be allowed to forward traffic to and from Ethernet Segment 14A. In all-active redundancy mode, all PE routers attached to an Ethernet Segment are allowed to forward traffic to/from that Ethernet Segment. For instance, in all-active redundancy mode, each of PE routers 10A, 10B, and 10E are allowed to forward traffic to and from Ethernet Segment 14A. As further described in this disclosure, when operating in all-active redundancy mode, one of PE routers 10A, 10B, or 10E in Ethernet Segment 14A may be elected as the designated forwarder (DF) to forward Broadcast, Unknown Unicast, and Multicast (BUM) traffic to and from Ethernet Segment 14A, while non-designated forwarders will drop such BUM traffic for Ethernet Segment 14A.

In an EVPN that does not utilize PBB, a PE router performs MAC learning of customer/client MAC (C-MAC) addresses and advertises the C-MACs in BGP MAC Advertisement Routes to other PE routers in the EVPN. Such BGP MAC Advertisement Routes indicate the reachability of the C-MACs via the PE router that advertised the BGP MAC Advertisement Routes. Therefore, in EVPN, all the PE nodes participating in the same EVPN instance are exposed to all the C-MAC addresses learnt by any one of these PE routers because a C-MAC learned by one of the PE routers is advertised to other PE routers in that EVPN instance.

To reduce the number of BGP MAC Advertisement routes and the size of C-MAC tables, PBB-EVPN relies on a MAC summarization scheme, as is provided by PBB. In the MAC summarization scheme, network packets are forwarded through service provider network 12 by encapsulating network packets with source and destination Backbone MAC (B-MAC) addresses. PBB-EVPN defines a B-MAC address space of B-MAC addresses that are independent of a C-MAC address space, and aggregates C-MAC addresses via a single B-MAC address.

Each PE router may maintain a B-MAC table and a C-MAC table for the respective address spaces. A PE router may build a B-MAC table that includes associations between B-MAC addresses and respective sets of PE router IP addresses that are associated with a particular Ethernet Segment. For instance, an entry or row in a B-MAC table of a PE router may include a B-MAC address and a set of identifiers (e.g., MAC or IP addresses) of PE routers in a particular Ethernet Segment, where the PE router has configured the B-MAC address to correspond to the particular Ethernet Segment. Each PE router may be associated with an MPLS label that uniquely identifies the respective PE router, and the MPLS label may be associated with the respective identifier or entry in B-MAC table for respective PE router.

PE routers may be initially configured to associate a B-MAC with a particular Ethernet Segment. For instance, PE routers 10A, 10B, and 10E may each be configured in the Ethernet Segment 14A. To perform this configuration, PE routers 10A, 10B, and 10E may each store a mapping that represents an association between an identifier of Ethernet Segment 14A and a common B-MAC address (e.g., B-MAC1). As such, PE routers 10A, 10B, and 10E may encapsulate egress traffic forwarded into the service provider network 12 with B-MAC1 as the source B-MAC address.

In PBB-EVPN, PE routers learn remote C-MAC to B-MAC bindings in the data plane for traffic received from the core per-PBB bridging operation. For instance, PE routers initially advertise local B-MAC address reachability information in BGP to all other PE routers in the same set of service instances, but perform C-MAC learning in the data plane. When advertising reachability, each PE router may advertise an MPLS label that identifies the respective PE router. As an example, if PE router 10A receives a network packet from customer network 6C, PE router 10A may perform C-MAC learning to store an association, in the C-MAC table of PE router 10A, between B-MAC1 and the source C-MAC of the network packet. PE router 10A may encapsulate the packet with B-MAC1 as the source B-MAC and B-MAC2 as the destination B-MAC, where B-MAC2 is associated with PE router 10C. PE router 10C, upon receiving the network packet may perform MAC learning based on the source C-MAC included in the packet. If PE router 10C does not include an entry in its C-MAC table for the source C-MAC, then PE router 10C may store an entry that includes an association between the source C-MAC and B-MAC1.

At a later time, if PE router 10C receives a network packet from customer network 6A, PE router 10C may determine the destination C-MAC for the packet matches the previously learned C-MAC stored in C-MAC table of PE router 10A that is associated with B-MAC1. PE router 10A may encapsulate the packet with B-MAC2 as the source B-MAC and B-MAC1 as the destination B-MAC. To forward the network packet to Ethernet Segment 14A that corresponds to B-MAC1, PE router 10C performs a lookup in its B-MAC table. PE router 10C identifies an entry with B-MAC1 and selects the IP address of one of PE routers 10A, 10B, or 10E, which are each associated with B-MAC1 in the B-MAC table. If PE router 10C selects PE router 10A as PE router to forward the network packet to customer network 6C, PE router 10C includes the MPLS label for PE router 10A as part of the network packet header and forwards the network packet using its egress interface for PE router 10A. PE router 10A, upon receiving the network packet, performs a lookup in the C-MAC table based on the destination C-MAC included in the network packet. Because PE router 10A previously learned the C-MAC address, PE router 10A forwards the network packet to customer network 6C using the interface for link 16D.

At configuration and startup, a PE router, such as PE router 10A performs a number of operations. For instance, PE router 10A discovers all remote PE routers for a PBB I-SID in which PE router 10A is included. PE router 10A, at configuration and startup, distributes B-MACs to other PE routers in the PBB I-SID, so as to indicate PE router 10A is reachable via the B-MACs, which may be associated with respective Ethernet Segments. PE router 10A, at configuration and startup, may also discover other PE routers in the same Ethernet Segment (e.g., PE routers 10B and 10E in Ethernet Segment 14A) and perform a designated forwarder (DF) election that is responsible for forwarding Broadcast, Unidentified Unicast or Multicast traffic (BUM) traffic for a given PBB B-MAC, and/or Ethernet Segment. In the example of FIG. 1, PE router 10A is elected the DF and PE routers 10B and 10E are elected non-DFs or backup-DFs. As such, PE router 10A will forward BUM traffic from service provider network 12 for BMAC-1, while PE routers 10B and 10E will not.

As shown in FIG. 1, CE routers 8 may be multi-homed and/or singly-homed to one or more of PE routers 10. In EVPN, a CE router may be said to be multi-homed when it is coupled to two physically different PE routers on the same EVI when the PE routers are resident on the same physical Ethernet Segment. As one example, CE router 8C is coupled to PE routers 10A, 10B, and 10E via links 16D-16F, respectively, where 10A, 10B, and 10E are capable of providing access to EVPN for L2 customer network 6C via CE router 8C. In instances where a given customer network (such as customer network 6C) may couple to service provider network 12 via two different and, to a certain extent, redundant links, the customer network may be referred to as being "multi-homed." In this example, CE router 8C may be multi-homed to PE routers 10A, 10B, and 10E because CE router 8C is coupled to two different PE routers PE routers 10A, 10B, and 10E via separate and, to a certain extent, redundant links 16D-16F where PE routers 10A, 10B, and 10E are each capable of providing access to EVPN for L2 customer network 6C. Multi-homed networks are often employed by network operators so as to improve access to EVPN provided by service provider network 12 should a failure in one of links 16D, 16E, and 16F occur. In a typical EVPN configuration, only the multi-homing PEs 10A, 10B, and 10E participate in DF election for each ESI. CE router 8B is single-homed to PE router 10A via communication link 16C.

An EVPN, such as illustrated in FIG. 1, may operate over a Multi-Protocol Label Switching (MPLS)-configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path.

As shown in the example of FIG. 1, PE routers 10A-10E and provider router 18 may provide an MPLS core for sending network packets from customer network 6A to and from customer network 6C. Each of PE routers 10A-10E implement the MPLS protocol and apply one or more MPLS labels, i.e., a label stack, to network packets in accordance with routing and forwarding information configured at each respective PE router. As described above, PE router 10C may attach an MPLS label advertised by PE router 10A to a packet that PE router 10C is forwarding to PE router 10A, such that the packet is forwarded through service provider network 12 to PE router 10C.

In system 2 of FIG. 1, PE routers 10A and 10B operate in all-active redundancy mode for B-MAC1 and Ethernet Segment 14A, while PE router 10E is initially not configured for B-MAC1 and Ethernet Segment 14A. If, as described above, PE router 10A sends a network packet to PE router 10C with a C-MAC that PE router 10C has not previously learned, PE router 10C will learn the C-MAC by storing the C-MAC in the C-MAC table of PE router 10C. After PE router 10C has learned the C-MAC, PE router 10E may come online and be configured for B-MAC1 and Ethernet Segment 14A. Like PE router 10A, at initial configuration and startup, PE router 10E discovers all remote PE routers for a PBB I-SID in which PE router 10E is included. PE router 10E, at configuration and startup, distributes B-MACs to other PE routers in the PBB I-SID, so as to indicate PE router 10E is reachable via the B-MACs, which may be associated with respective Ethernet Segments. For instance, PE router 10C may receive a BGP messages from PE router 10E that indicates B-MAC 1 is reachable via PE router 10E. PE router 10E, at configuration and startup, may also discover other PE routers in the same Ethernet Segment (e.g., PE routers 10A and 10B in Ethernet Segment 14A) and perform a designated forwarder (DF) election.

PE router 10C may later receive a network packet destined for customer network 6 after PE router 10C has configured its B-MAC table to include an association between B-MAC1 and an identifier of PE router 10E. PE router 10C may determine that the network packet includes the previously learned C-MAC by performing a lookup in the C-MAC table that includes an association between the C-MAC and B-MAC1. Based on the association between the C-MAC and B-MAC1, PE router 10C may perform a lookup in its B-MAC table which includes B-MAC1 associated with identifiers of PE routers 10A, 10B, and 10E. Using one or more load-balancing operations, PE router 10C may use the identifier of PE router 10E to forward the network packet to PE router 10E. For instance, PE router 10C may encapsulate the packet with B-MAC2 as the source B-MAC, B-MAC1 as the destination B-MAC, and attach and MPLS label previously advertised by PE router 10E that identifies PE router 10E the PBB-EVPN. PE router 10C may then forward the encapsulated packet as known unicast traffic to PE router 10E using a logical interface of PE router 10C that corresponds to PE router 10E. Notably, source and destination C-MACs may be included in the encapsulated network packet as it is sent to provider network 12.

PE router 10E may receive the encapsulated packet and perform a lookup in the C-MAC table for an entry that includes the destination C-MAC of the encapsulated packet. Conventionally, if PE router 10E had not previously learned the C-MAC address (e.g., the C-MAC address is not included in the C-MAC table), then PE router 10E would have dropped the encapsulated network packet because PE router 10E is not the DF for Ethernet Segment 14A that is associated with B-MAC 1. Rather than dropping the encapsulated network packet, PE router 10E is configured to, in accordance with techniques of the disclosure determine whether PE router 10E is included in an Ethernet Segment that corresponds to the destination B-MAC, i.e., B-MAC1. To perform this determination, PE router 10E determines whether the destination B-MAC, i.e., B-MAC1, is included in the B-MAC table of PE router 10E. If PE router 10E determines that B-MAC1 is included in the B-MAC table, then PE router 10E determines the egress interface for Ethernet Segment 14A based on an association between B-MAC1 and an identifier of Ethernet Segment 14A. PE router 10E removes at least the destination and source B-MACs and the MPLS labels used for forwarding the encapsulated network through service provider network 12, and forwards the network packet to CE router 8C via communication link 16F that corresponds to the egress interface.

As described above in accordance with techniques of the disclosure, PE router 10E may avoid dropping known unicast traffic from remote PE routers for B-MAC1, although PE router 10E has not yet learned the C-MAC address in such known unicast traffic and although PE router 10E is not the designated forwarder for Ethernet Segment 14A. As such, rather than dropping known unicast traffic destined for customer network 6C, PE router 10E may forward the network traffic, thereby reducing or eliminating the need for PE router 10C to re-send known unicast packets that would otherwise have been dropped. Accordingly, techniques of the disclosure may prevent PE router 10E from treating known unicast traffic as BUM traffic when PE router 10E has not yet learned the C-MAC in the known unicast traffic. This can reduce or avoid dropped traffic (an effect sometimes referred to as "traffic black holing"), and may also improve a speed of network convergence in active-active PBB-EVPN redundancy systems.

Figure 2:
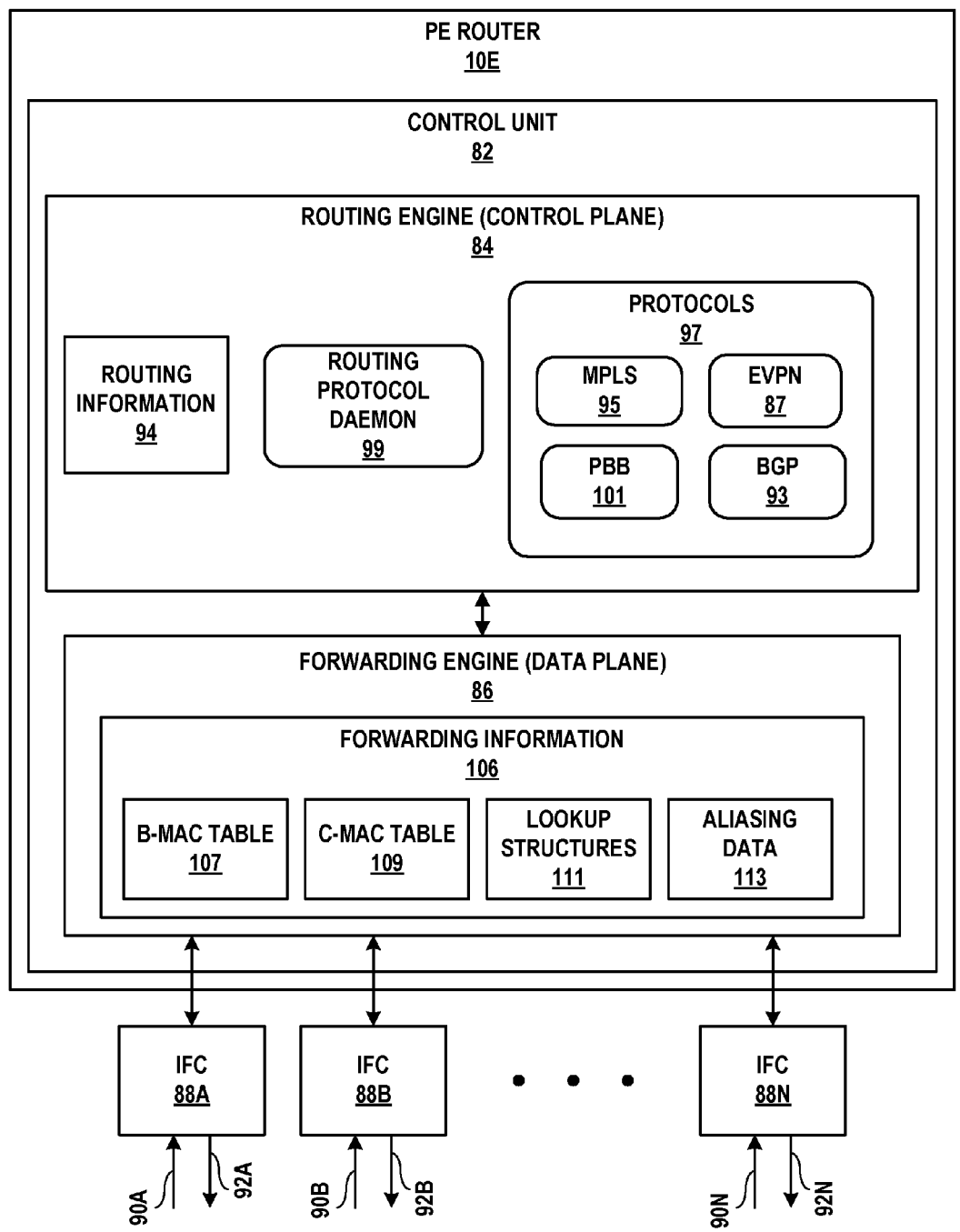
FIG. 2 is a block diagram illustrating an example PE router capable of performing the disclosed techniques.

FIG. 2 is a block diagram illustrating an example PE router 10E capable of performing the disclosed techniques. In general, PE router 10E may operate substantially similar to PE router 10E of FIG. 1. In this example, PE router 10E includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface interfaces. PE router 10E also includes a control unit 82 that determines routes of received packets and forwards the packets accordingly via IFCs 88.

Control unit 82 may comprise a routing engine 84 and a packet forwarding engine 86 (or "forwarding unit"). Routing engine 84 operates as the control plane for provider router 18 and includes an operating system that provides a multitasking operating environment for execution of a number of concurrent processes. Routing engine 84, for example, execute software instructions to implement one or more control plane networking protocols 97. For example, protocols 97 may include one or more routing protocols, such as Border Gateway Protocol (BGP) 99 for exchanging routing information with other routing devices and for updating routing information 94. Protocols 97 may also include Multiprotocol Label Switching Protocol (MPLS) 95 for tunneling packets within service provider network 12.

Routing protocol daemon (RPD) 99 may use protocols 97 to exchange routing information, stored in routing information 94, with other routers. Routing information 94 may include information defining a topology of a network. RPD 99 may resolve the topology defined by routing information in routing information 94 to select or determine one or more routes through the network. RPD 99 may then generate forwarding information 106 and update forwarding plane 86 with routes from forwarding information 106.

Routing information 94 may describe a topology of the computer network in which provider router 18 resides, and may also include routes through the shared trees in the computer network. Routing information 94 describes various routes within the computer network, and the appropriate next hops for each route, i.e., the neighboring routing devices along each of the routes. Routing engine 84 analyzes stored routing information 94 and generates forwarding information 106 for forwarding engine 86. Forwarding information 106 may associate, for example, network destinations for certain multicast groups with specific next hops and corresponding IFCs 88 and physical output interfaces for output links 92. Forwarding information 106 may be a radix tree programmed into dedicated forwarding chips, a series of tables, a complex database, a link list, a radix tree, a database, a flat file, or various other data structures.

In addition, routing engine 84 executes EVPN protocol 87, which operates to communicate with other routers to establish and maintain an EVPN, such as the EVPN of FIG. 1, for transporting L2 communications through an intermediate network so as to logically extend an Ethernet network through the intermediate network. EVPN protocol 87 may, for example, communicate with EVPN protocols executing on remote routers. EVPN protocol 87 may operate in accordance with techniques described in "BGP MPLS-Based Ethernet VPN," RFC 7432, February 2015, the entire contents of which are incorporated herein by reference.

Routing engine 84 executes PBB protocol 101 in accordance with IEEE 802.1ah-2008, Provider Backbone Bridges, June 2008, the entire contents of which are incorporated herein by reference. PBB protocol 101 provides for the exchange of control plane messages that include PBB configuration information, such as announcing B-MAC addresses. PBB protocol 101 is also used by PE router 10E to encapsulate network packets with PBB headers, such as source and destination B-MAC addresses.

In some examples, forwarding engine 86 arranges forwarding structures as next hop data that can be chained together as a series of "hops" along an internal packet forwarding path for the network device. In many instances, the forwarding structures perform lookup operations within internal memory of ASICs included in forwarding engine 86, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs determines the manner in which a packet is forwarded or otherwise processed by forwarding engine 86 from its input interface on one of IFCs 88 to its output interface on one of IFCs 88.

As shown in FIG. 2, forwarding information 106 includes B-MAC table 107. B-MAC table 107 includes data representing mappings or associations between B-MAC addresses and Ethernet Segments. For instance, B-MAC table 107 includes a B-MAC address as key and a list of identifiers of PE routers included in an Ethernet Segment that corresponds to the B-MAC address. Forwarding information 106 also includes C-MAC table 109. C-MAC table 109 includes data representing mappings or associations between C-MAC addresses and B-MAC addresses. In some examples, C-MAC table 109 includes a C-MAC address as a key and a B-MAC address as the corresponding value, or vice versa. Forwarding information 106 may also include aliasing data 113. Aliasing data 113 may include data representing mappings or associations between B-MAC addresses and identifiers of Ethernet Segments.

Forwarding information may also include lookup structures 111. Lookup structures 111 may, given a key, such as an address, provide one or more values. In some examples, the one or more values may be one or more next hops. A next hop may be implemented as microcode, which when executed, perform one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

As described above, in system 2 of FIG. 1, PE routers 10A and 10B initially operate in all-active redundancy mode for B-MAC1 and Ethernet Segment 14A. PE router 10E is initially not configured for B-MAC1 and Ethernet Segment 14A. PE router 10A initially sends a network packet to PE router 10C with a C-MAC that PE router 10C has not previously learned, PE router 10C will learn the C-MAC by storing the C-MAC in the C-MAC table of PE router 10C.

After PE router 10C has learned the C-MAC, PE router 10E may come online and be configured for B-MAC1 and Ethernet Segment 14A. At initial configuration and startup, PE router 10E discovers all remote PE routers for a PBB I-SID in which PE router 10E is included. For instance, RPD 99 may communicate with PBB 101, BGP 93, and EVPN 87 to generate a MAC Advertisement Route message (as described in draft-ietf-l2vpn-pbb-evpn-10) that includes B-MAC1, which may be configured by an administrator or operator of PE router 10E. PE router 10E may send the MAC Advertisement Router message to other PE routers in the PBB I-SID that includes PE router 10E. In this way, other PE routers in service provider network 12 determine that B-MAC1 is reachable via PE router 10E. The PE routers that received the MAC Advertisement Router message may similarly send PE router 10E respective MAC Advertisement Router messages that indicate the reachability of the same B-MAC1 and/or other B-MACs via the respective PE routers.

PE router 10C may later receive a network packet destined for customer network 6 after PE router 10C has configured its B-MAC table to include an association between B-MAC1 and an identifier of PE router 10E. PE router 10C may determine that the network packet includes the previously learned C-MAC by performing a lookup in the C-MAC table that includes an association between the C-MAC and B-MAC1. Based on the association between the C-MAC and B-MAC1, PE router 10C may perform a lookup in its B-MAC table which includes B-MAC1 associated with identifiers of PE routers 10A, 10B, and 10E. PE router 10C may use the identifier of PE router 10E to forward the network packet to PE router 10E. For instance, PE router 10C may encapsulate the packet with B-MAC2 as the source B-MAC, B-MAC1 as the destination B-MAC, and attach an MPLS label previously advertised by PE router 10E that identifies PE router 10E the PBB-EVPN. PE router 10C may then forward the encapsulated packet as known unicast traffic to PE router 10E using a logical interface of PE router 10C that corresponds to PE router 10E.

PE router 10E may initially receive the encapsulated packet at interface 88A. Forwarding engine 86 determines the destination C-MAC included in the encapsulated packet and determines whether C-MAC table 109 includes the destination C-MAC. In the examples of FIGS. 1 and 2, PE router 10E has not yet learned the destination C-MAC of the packet, when PE router 10C forwards the packet to PE router 10E. As such, when forwarding engine 86 performs a lookup on C-MAC table 109, forwarding engine 86 determines that the C-MAC is not in table 109. If the C-MAC were included in C-MAC table 109, then PE router 10E would forward the network packet using the egress interface for the C-MAC in C-MAC table 109.

Because the C-MAC is not included in C-MAC table 109, forwarding engine 106, in accordance with techniques of the disclosure identifies the destination B-MAC1 in the encapsulated network packet. Forwarding engine 106 determines whether destination B-MAC1 is included in B-MAC table 107. If forwarding engine 106 determines that B-MAC1 is not included in B-MAC table 107, then forwarding engine 106 treats the packet as BUM traffic and drops the packet because PE router 10E is not the DF in Ethernet Segment 14A. If, however, forwarding engine 106 determines that B-MAC1 is included in B-MAC table 107, then PE router 10E determines the egress interface for Ethernet Segment 14A based on an association in aliasing data 113 between B-MAC1 and an identifier of Ethernet Segment 14A. That is, upon determining that Ethernet Segment 14A is associated with B-MAC1, PE router 10A determines the egress interface for Ethernet Segment 14A. Forwarding engine 86 forwards the network packet using the egress interface to CE router 8C.

The architecture of PE router 10E illustrated in FIG. 2 is shown for example purposes only. The invention is not limited to this architecture. In other examples, PE router 10E may be configured in a variety of ways. In one example, some of the functionality of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

Figure 3A:
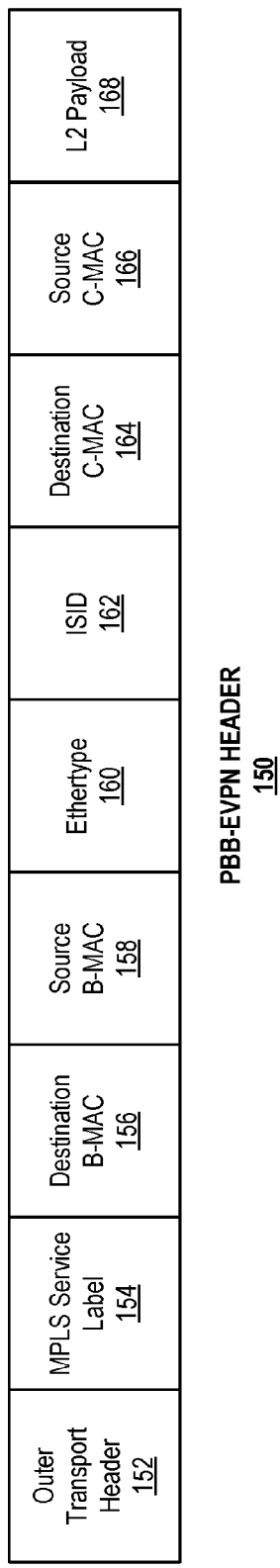
FIGS. 3A-3B are example block diagrams of a PBB-EVPN header and B-MAC table, in accordance with techniques of the disclosure.
Figure 3B:
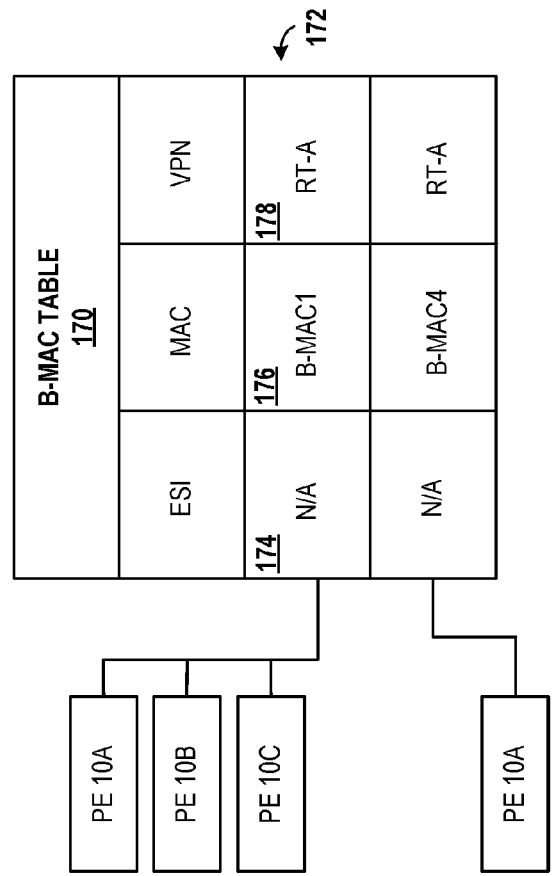

FIGS. 3A-3B are example block diagrams of a PBB-EVPN header and B-MAC table, in accordance with techniques of the disclosure. FIG. 3A illustrates an example PBB-EVPN header and L2 payload. As shown in FIG. 3A, header 150 includes an outer transport label 152 and inner MPLS service label 154. MPLS service label 154 may be an MPLS label that uniquely identifies PE router 10E within an EVPN Instance (EVI). For instance, PE router 10E may advertise MPLS service label 154 to other PE routers in the same EVI. Outer transport label 152 may be an MPLS label advertised by a provider router in provider network 12 that is one hop away from PE router 10C. PBB-EVPN header 150 includes destination B-MAC address 156 and source B-MAC address 158. In the examples of FIGS. 1-2 and 4-5, PE router 10C, may when sending a network packet to PE router 10E, include B-MAC1 as destination B-MAC address 156 and B-MAC2 as source B-MAC address 158. When PE router 10E later determines that destination C-MAC 164 is not included in the C-MAC table of PE router 10E, PE router 10E may determine whether destination B-MAC address 156 is included in the B-MAC table of PE router 10E.

PBB-EVPN header 150 also includes Ethertype 160 and ISID 162. Ethertype 160 may be a unique value that indicates the type of packet, i.e., a PBB-EVPN packet. ISID 162 may be an identifier of a PBB B-Service instance that includes B-MAC1. PBB-EVPN header 150 also includes destination C-MAC address 164 and source C-MAC address 166. In the examples of FIGS. 1-2 and 4-5, when PE router 10C sends a network packet to PE router 10E, destination C-MAC address 164 may be a C-MAC address of customer equipment 4E and source C-MAC 166 may be a C-MAC address of customer equipment 4A. When PE router 10E receives a network packet from PE router 10C, prior to learning source C-MAC address 166, PE router 10E may determine destination B-MAC address 156 is included in the B-MAC table of PE router 10E. Based on determining that destination B-MAC address 156 is included in the B-MAC table, PE router 10E determines an egress interface included the Ethernet Segment 14A that is associated with destination B-MAC1 and forwards the network packet using the egress interface to customer network 6C.

FIG. 3B illustrates a B-MAC table 170 of PE router 10C. B-MAC table 170 includes columns for Ethernet Segment Identifier (ESI), B-MAC address, and VPN. For instance, entry 172 includes an ESI value 174. In some examples, ESI value 174 is a unique identifier of Ethernet Segment 14A. In such cases, PE router 10E includes a separate data structure that includes ESI value 174 associated with a list that includes identifiers of PE routers included in Ethernet Segment 14A. In other examples, ESI value 174 is a pointer or reference to a list of identifiers of PE routers included in Ethernet Segment 14A. As shown in FIG. 3B, ESI value 174 is a pointer to a list of identifiers of PE routers 10A, 10B, and 10C. The identifiers of PE routers 10A, 10B, and 10E may be IP addresses, MAC addresses, MPLS labels advertised by the respective PE routers, or any other suitable identifier for identifying a PE router. Entry 172 also includes B-MAC1, which is associated with Ethernet Segment 14A. Because B-MAC1 is included in the same entry 172 as ESI value 174, B-MAC1 is associated with PE routers included in Ethernet Segment 14A, and more generally, associated with Ethernet Segment 14A. Entry 172 also includes a Route Target 178. In accordance with techniques of the disclosure, if PE router 10E receives a network packet from PE router 10C that is destined for customer network 6C and PE router 10E determines that the destination C-MAC is not included in the C-MAC table of PE router 10E, then PE router 10E performs a lookup on B-MAC table 170 and determines that entry 172 includes B-MAC1. PE router 10E performs a lookup on aliasing data as described in FIG. 2 to determine whether B-MAC1 is associated with an Ethernet Segment that includes PE router 10E. PE router 10E may determine that B-MAC1 is included in the aliasing data, further determine that B-MAC1 is associated with Ethernet Segment 14A. PE router 10E may determine the egress interface associated with Ethernet Segment 14A and forward the packet using the egress interface, rather than treating the packet as BUM traffic and dropping the packet.

Figure 4:
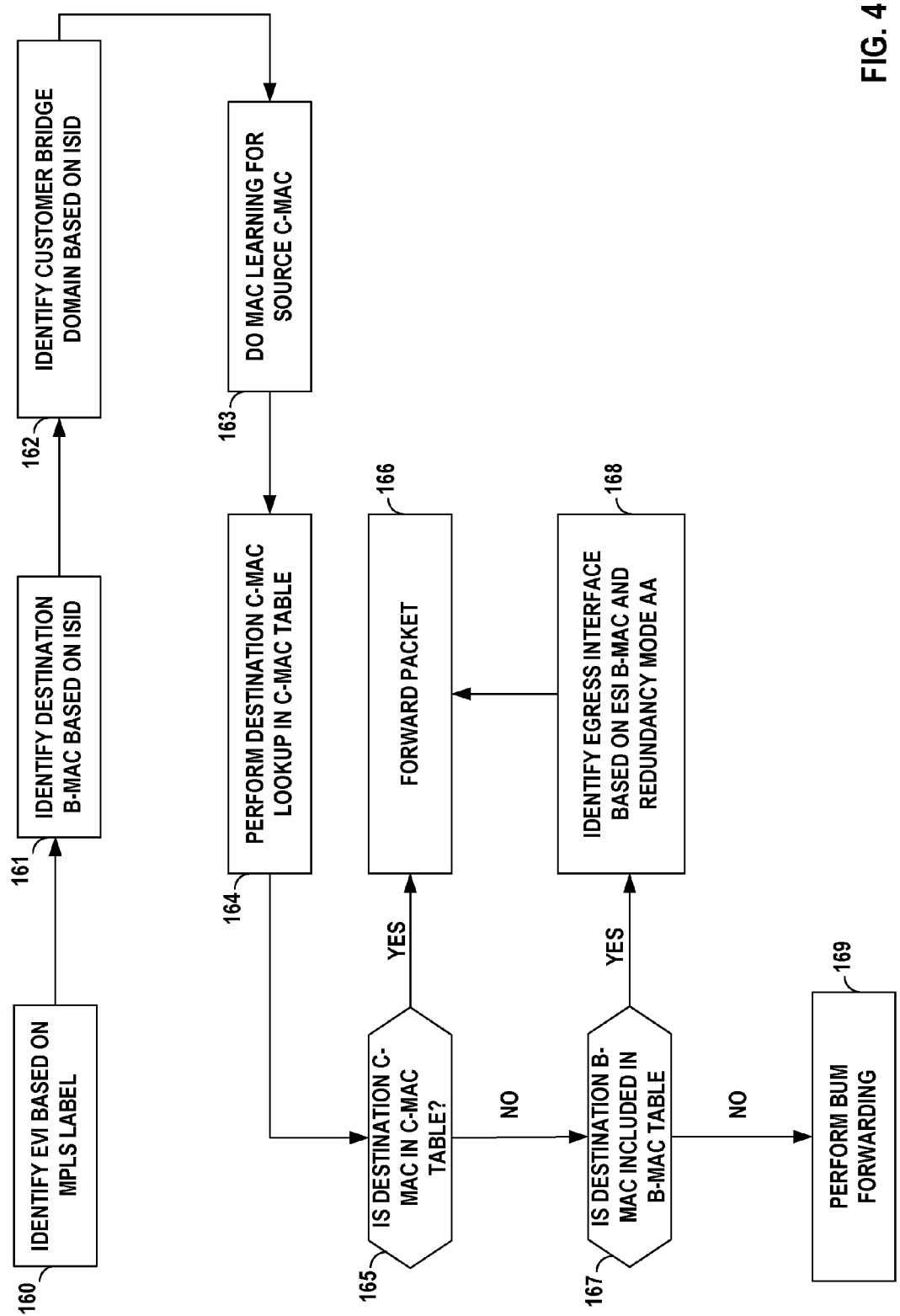
FIG. 4 is a flowchart illustrating example operations of a PE router, in accordance with techniques of the disclosure.

FIG. 4 is a flowchart illustrating example operations of system 2, in accordance with techniques of the disclosure. Example operations in accordance with techniques of the disclosure are illustrated for example purposes with respect to PE router 10E. As described in FIGS. 1-3 and 5, PE router 10E may join Ethernet Segment 14A and B-MAC1 and later receive a network packet from PE router 10C that is destined for customer network 6C but prior to PE router 10E learning the destination C-MAC of the network packet. As shown in FIG. 4, in response to receiving the network packet, PE router 10E identifies an EVI for the network packet based on the MPLS service label included in the network packet (160). For instance, PE router 10E may determine MPLS service label 154 corresponds to a particular EVI. PE router 10E may determine the destination B-MAC, e.g., B-MAC1, included in the network packet (161). For instance, the destination B-MAC may be destination B-MAC 156 as shown in FIG. 3A. PE router 10E may identify the customer bridge domain based on the ISID included in the network packet header (162). Determining the customer bridge domain enables PE router 10E to determine the C-MAC table for the ISID.

PE router 10E performs MAC learning of the source C-MAC address (163). For instance, PE router 10E stores an entry in its C-MAC table for the ISID of the packet, which indicates an association between the source-CMAC and source B-MAC2. PE router 10E then performs a MAC lookup in the C-MAC table for the destination C-MAC address (164). PE router 10E determines whether the destination C-MAC is included in the C-MAC table (165). If the destination C-MAC is in the C-MAC table, then PE router 10E determines the B-MAC corresponding to the destination C-MAC and identifies the egress interface associated with the B-MAC. PE router 10E forwards the network packet using the egress interface (166).

In the example of FIG. 4, the destination C-MAC of the network packet is not included in the C-MAC table for the ISID. In accordance with techniques of the disclosure, PE router 10E determines whether the destination B-MAC is included in the B-MAC table for the ISID (167). PE router 10E determines that the destination B-MAC1 from the network packet is included in the B-MAC table. Accordingly, PE router 10E determines an egress interface associated with Ethernet Segment 14A, based on using aliasing data to determine that Ethernet Segment 14A corresponds to B-MAC1 (168). PE router 10E forwards the packet using the egress interface (166). If the B-MAC table of PE router 10E does not include the destination B-MAC1, then PE router 10E performs BUM forwarding (169). For instance, if PE router 10E is not the DF for Ethernet Segment 14A, then PE router 10E drops the packet. If PE router 10E is the DF for Ethernet Segment 14A, then PE router 10E floods the packet within Ethernet Segment 14A to PE routers 10A and 10B.

Figure 5:
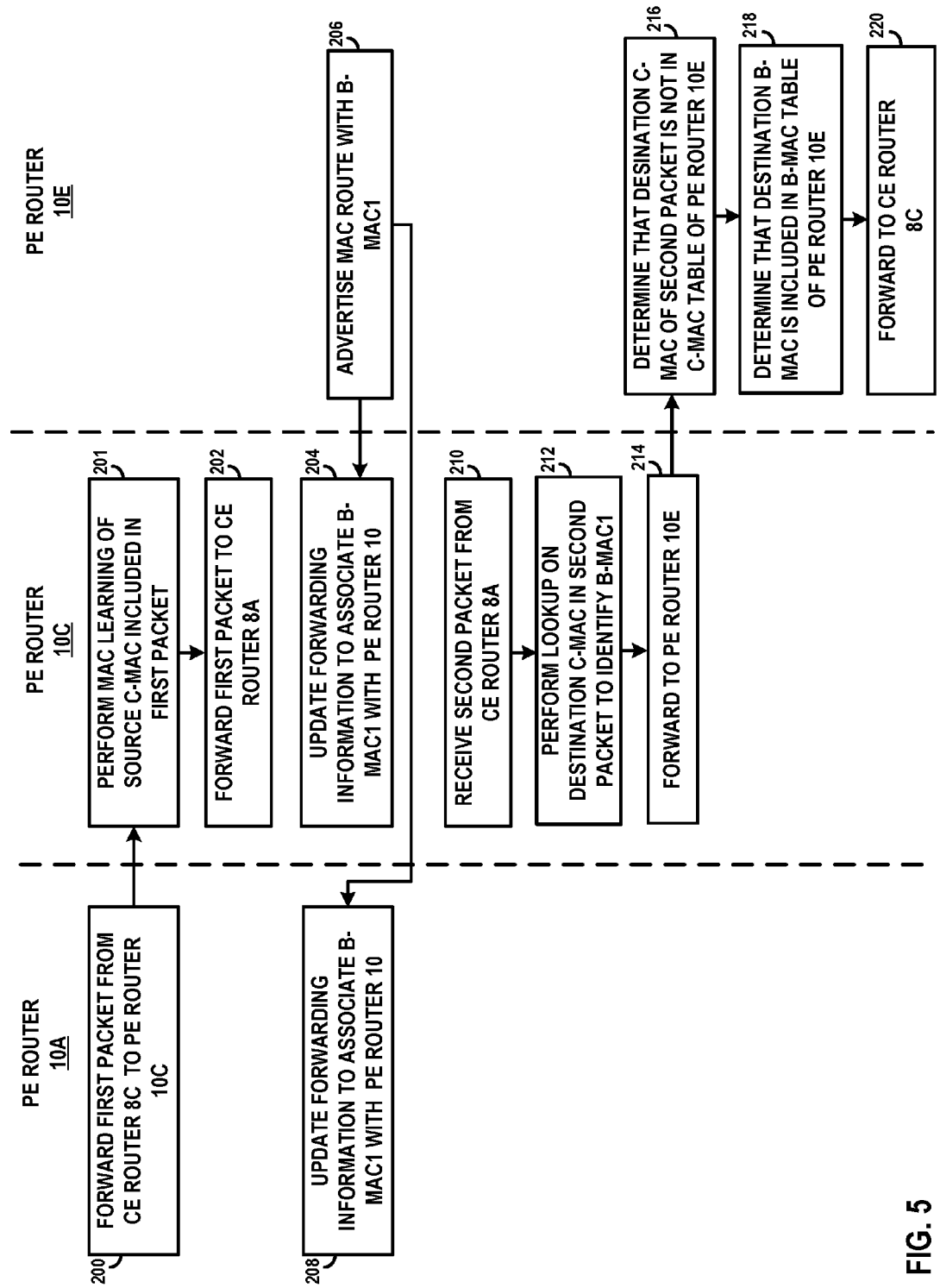
FIG. 5 is a flowchart illustrating example operations of a system of PE routers, in accordance with techniques of the disclosure.

FIG. 5 is a flowchart illustrating example operations of system 2, in accordance with techniques of the disclosure. Example operations in accordance with techniques of the disclosure are illustrated for example purposes with respect to PE routers 10A, 10B and 10E. As shown in FIG. 5, PE router 10A may initially receive a first packet from CE router 8C that is destine for customer network 6A. PE router 10A may perform a lookup on the source C-MAC and determine that the source C-MAC of the packet is not included in the C-MAC table of PE router 10A. PE router 10A may perform MAC learning by storing the source C-MAC in the C-MAC table in association with B-MAC1, which is associated with Ethernet Segment 14A. PE router 10A forwards the network packet to PE router 10C (200). As described in this disclosure, PE router 10A may encapsulate the first network packet with a PBB header that includes at least a source B-MAC1 and a destination B-MAC2.

PE router 10C receives the first network packet with the PBB header. PE router 10C performs MAC learning based on source C-MAC and source B-MAC1 by storing data in the C-MAC table of PE router 10C that indicates an association between the source C-MAC and source B-MAC1 (201). In this way, PE router 10C, when receiving traffic from customer network 6A that is destined for customer network 6C, may forward the network traffic as known unicast traffic to B-MAC1. PE router 10C, upon determining that the destination C-MAC of the first network packet corresponds to customer network 6A, sends the first network packet to customer network 6A.

At a later time, PE router 10E joins Ethernet Segment 14A, which corresponds to B-MAC1. PE router 10E sends MAC Route Advertisements to at least PE routers 10B and 10C that indicate PE router 10E is included in B-MAC1 (206). PE routers 10C and 10A receive respective MAC Route Advertisements, update their respective forwarding information to associate PE router 10E with PE routers 10A and 10C (208, 204). As an example, PE router 10C creates an entry in its B-MAC table that indicates an association between B-MAC1 and an identifier of PE router 10E (e.g., IP address, MAC address, MPLS label advertised by PE router 10E, etc.). PE router 10A creates a similar entry in its B-MAC table like PE router 10C.

After PE router 10C has updated its B-MAC table to include B-MAC1, PE router 10C may receive a second network packet from CE router 8A that is destined for customer network 6C (210). PE router 10C may identify the destination C-MAC of the network packet and perform a lookup in the C-MAC table of PE router 10C (212). Since PE router 10C previously learned the destination C-MAC, which is stored in the C-MAC table, PE router 10C may determine that B-MAC1 is associated with the destination C-MAC. PE router 10C may perform a lookup on B-MAC1 to select one of PE routers 10A, 10B, or 10E to forward the second network packet. Because each of PE routers 10A, 10B, and 10E are each associated with B-MAC1 in PE router 10C's B-MAC table, PE router 10C may perform one or more load-balancing operations (e.g., round-robin, header-based hashing, or any other suitable load-balancing technique) to select PE router 10E. PE router 10C determines an interface associated with PE router 10E and forwards the second network packet to service provider network 12 (214). As described in this disclosure, PE router 10C may attach a source B-MAC1 and destination B-MAC2 to the second network packet. PE router 10C may attach an MPLS label previously advertised by PE router 10E for forwarding network packets to PE router 10E through service provider network 12 (e.g., an inner service label). PE router 10E may also attach an MPLS label that corresponds to a direct next hop (e.g., provider router) in service provider network 12 to which PE router 10C forwards the second network packet (e.g., an outer transport label).

PE router 10E receives the second network packet. Upon receiving the second network packet PE router 10E performs a lookup based on the destination C-MAC included in the network packet. PE router 10E determines that the destination C-MAC is not included in the C-MAC table of PE router 10E because PE router 10E has not previously learned the destination C-MAC (216). For instance, PE router 10E has not previously received a network packet that included the destination C-MAC as a source C-MAC and has not stored such as source C-MAC in the C-MAC table of PE router 10E in association with B-MAC1. Rather than discarding the second network packet as BUM traffic because PE router 10E is not the DF for Ethernet Segment 14A, PE router 10E performs an additional lookup in the B-MAC table of PE router 10E. To perform the lookup, PE router 10E determines whether the destination B-MAC1 is included in the B-MAC table of PE router 10E. If the destination B-MAC1 is not included in the B-MAC table, then PE router 10E treats the packet as BUM traffic and drops the packet. However, in the example of FIG. 5, PE router 10E determines that B-MAC1 is included in the B-MAC table of PE router 10E. PE router 10E determines the egress interface for Ethernet Segment 14A based on an association between B-MAC1 and an identifier of Ethernet Segment 14A. Upon determining the egress interface, PE router 10E forwards the second network packet to customer network 16C using the egress interface (220).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the invention have been described. These and other embodiments are within the scope of the following claims.

The invention claimed is:

1. A method comprising:
configuring a first provider edge (PE) router of a Provider Backbone Bridging (PBB) Ethernet Virtual Private Network (EVPN) to join an Ethernet Segment in active-active mode with at least a second PE router that is operating as a designated forwarder for the Ethernet Segment;
receiving, by the first PE router from a remote PE router and prior to the first PE router performing Media Access Control (MAC) learning of a customer-MAC (C-MAC) address that is reachable via a backbone-MAC (B-MAC) address associated with the Ethernet Segment, a network packet that includes the C-MAC address; and
in response to determining that the C-MAC address has not been learned by the first PE router and that the B-MAC address included in the network packet is associated with the Ethernet Segment, forwarding, by the first PE router, the network packet to a destination identified by the C-MAC address.

2. The method of claim 1,
wherein the network packet is a first network packet,
wherein configuring the first PE router to join the Ethernet Segment comprises configuring the first PE router after the second PE router has forwarded a second network packet to the remote PE router that includes the C-MAC address, and
wherein configuring the first PE router to join the Ethernet Segment comprises configuring the first PE router after the remote PE router has performed MAC learning of a C-MAC address included in the second network packet to determine the C-MAC address is reachable via the B-MAC address associated with the Ethernet Segment.

3. The method of claim 1, wherein the first PE router is not elected as the designated forwarder for the Ethernet Segment when configuring the first PE router to join the Ethernet Segment.

4. The method of claim 1, wherein determining that the C-MAC address has not been learned by the first PE router further comprises:
performing, based at least in part on the C-MAC address, a lookup on a C-MAC table comprising associations between C-MAC addresses and B-MAC addresses; and
determining, based at least in part on the lookup, that the C-MAC address is not included in the C-MAC table.

5. The method of claim 1, wherein determining that the B-MAC address included in the network packet is associated with the Ethernet Segment further comprises:
performing, based at least in part on the B-MAC address, a lookup on a B-MAC table comprising associations between B-MAC addresses and sets of PE routers in Ethernet Segments that correspond to the B-MAC addresses; and
determining, based at least in part on the lookup, that the B-MAC address is included in the B-MAC table.

6. The method of claim 5, further comprising:
in response to determining that the B-MAC address is included in the B-MAC table, determining an egress interface of the Ethernet Segment associated with the B-MAC address; and
wherein forwarding the network packet to the destination identified by the C-MAC address comprises forwarding the network packet to the destination using the egress interface.

7. The method of claim 1, wherein the network packet is sent by the remote PE router and to the first PE router as known unicast traffic.

8. A first provider edge (PE) router of a Provider Backbone Bridging (PBB) Ethernet Virtual Private Network (EVPN), the first PE router comprising:
a control unit having at least one processor coupled to a memory,
wherein the control unit executes software configured to:
join an Ethernet Segment in active-active mode with at least a second PE router that is operating as a designated forwarder for the Ethernet Segment;
receive, from a remote PE router and prior to the first PE router performing Media Access Control (MAC) learning of a customer-MAC (C-MAC) address that is reachable via a backbone-MAC (B-MAC) address associated with the Ethernet Segment, a network packet that includes the C-MAC address; and
in response to determining that the C-MAC address has not been learned by the first PE router and that the B-MAC address included in the network packet is associated with the Ethernet Segment, forward the network packet to a destination identified by the C-MAC address.

9. The first PE router of claim 8,
wherein the network packet is a first network packet,
wherein the software configured to join the Ethernet Segment comprises software configured to join the Ethernet Segment after the second PE router has forwarded a second network packet to the remote PE router that includes the C-MAC address, and
wherein the software configured to join the Ethernet Segment comprises software configured to join the Ethernet Segment after the remote PE router has performed MAC learning of a C-MAC address included in the second network packet to determine the C-MAC address is reachable via the B-MAC address associated with the Ethernet Segment.

10. The first PE router of claim 8, wherein the first PE router is not elected as the designated forwarder for the Ethernet Segment when configuring the first PE router to join the Ethernet Segment.

11. The first PE router of claim 8, further comprising software configured to determine that the C-MAC address has not been learned by the first PE router by:
performing, based at least in part on the C-MAC address, a lookup on a C-MAC table comprising associations between C-MAC addresses and B-MAC addresses; and
determining, based at least in part on the lookup, that the C-MAC address is not included in the C-MAC table.

12. The first PE router of claim 8, further comprising software configured to determine that the B-MAC address included in the network packet is associated with the Ethernet Segment by:
performing, based at least in part on the B-MAC address, a lookup on a B-MAC table comprising associations between B-MAC addresses and sets of PE routers in Ethernet Segments that correspond to the B-MAC addresses; and
determining, based at least in part on the lookup, that the B-MAC address is included in the B-MAC table.

13. The first PE router of claim 12, further comprising software configured to:
in response to determining that the B-MAC address is included in the B-MAC table, determine an egress interface of the Ethernet Segment associated with the B-MAC address; and
wherein the software configured to forward the network packet to the destination identified by the C-MAC address comprises software configured to forward the network packet to the destination using the egress interface.

14. The first PE router of claim 8, wherein the network packet is sent by the remote PE router and to the first PE router as known unicast traffic.

15. A non-transitory computer-readable medium comprising instructions for causing at least one programmable processor of a first (PE) router to:
join an Ethernet Segment in active-active mode with at least a second PE router that is operating as a designated forwarder for the Ethernet Segment;
receive, from a remote PE router and prior to the first PE router performing Media Access Control (MAC) learning of a customer-MAC (C-MAC) address that is reachable via a backbone-MAC (B-MAC) address associated with the Ethernet Segment, a network packet that includes the C-MAC address; and
in response to determining that the C-MAC address has not been learned by the first PE router and that the B-MAC address included in the network packet is associated with the Ethernet Segment, forward the network packet to a destination identified by the C-MAC address.

16. The non-transitory computer-readable medium of claim 15, wherein the first PE router and the second PE router are each part of a Provider Backbone Bridging (PBB) Ethernet Virtual Private Network (EVPN).

17. The non-transitory computer-readable medium of claim 15, wherein the first PE router is not elected as the designated forwarder for the Ethernet Segment when configuring the first PE router to join the Ethernet Segment.

18. The non-transitory computer-readable medium of claim 15, further comprising instructions for causing the at least one programmable processor to determine that the C-MAC address has not been learned by the first PE router by:
performing, based at least in part on the C-MAC address, a lookup on a C-MAC table comprising associations between C-MAC addresses and B-MAC addresses; and
determining, based at least in part on the lookup, that the C-MAC address is not included in the C-MAC table.

19. The non-transitory computer-readable medium of claim 15, further comprising instructions for causing the at least one programmable processor to determine that the B-MAC address included in the network packet is associated with the Ethernet Segment by:
performing, based at least in part on the B-MAC address, a lookup on a B-MAC table comprising associations between B-MAC addresses and sets of PE routers in Ethernet Segments that correspond to the B-MAC addresses; and
determining, based at least in part on the lookup, that the B-MAC address is included in the B-MAC table.

20. The non-transitory computer-readable medium of claim 15, wherein the network packet is sent by the remote PE router and to the first PE router as known unicast traffic.

* * * * *